March 19, 1929. A. K. PEHRSON 1,706,364

PASSAGEWAY DRIVE MECHANISM FOR ARTICULATED CAR UNITS

Filed April 18, 1928 2 Sheets-Sheet 1

INVENTOR
Alfred K. Pehrson

March 19, 1929.    A. K. PEHRSON    1,706,364

PASSAGEWAY DRIVE MECHANISM FOR ARTICULATED CAR UNITS

Filed April 18, 1928    2 Sheets-Sheet 2

INVENTOR
Alfred K. Pehrson,
by G. R. Lamke
Atty.

Patented Mar. 19, 1929.

1,706,364

UNITED STATES PATENT OFFICE.

ALFRED K. PEHRSON, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

PASSAGEWAY DRIVE MECHANISM FOR ARTICULATED CAR UNITS.

Application filed April 18, 1928. Serial No. 270,919.

This invention has for an object the rotation of the passageway member with the turning of the car bodies relative to each other so as to provide a free and uninterrupted passage between the car bodies at all times.

Another object of my invention is the provision of link and lever means for positioning the passageway member between the openings in the ends of the two adjacent car bodies of an articulated car unit.

Figure 1:
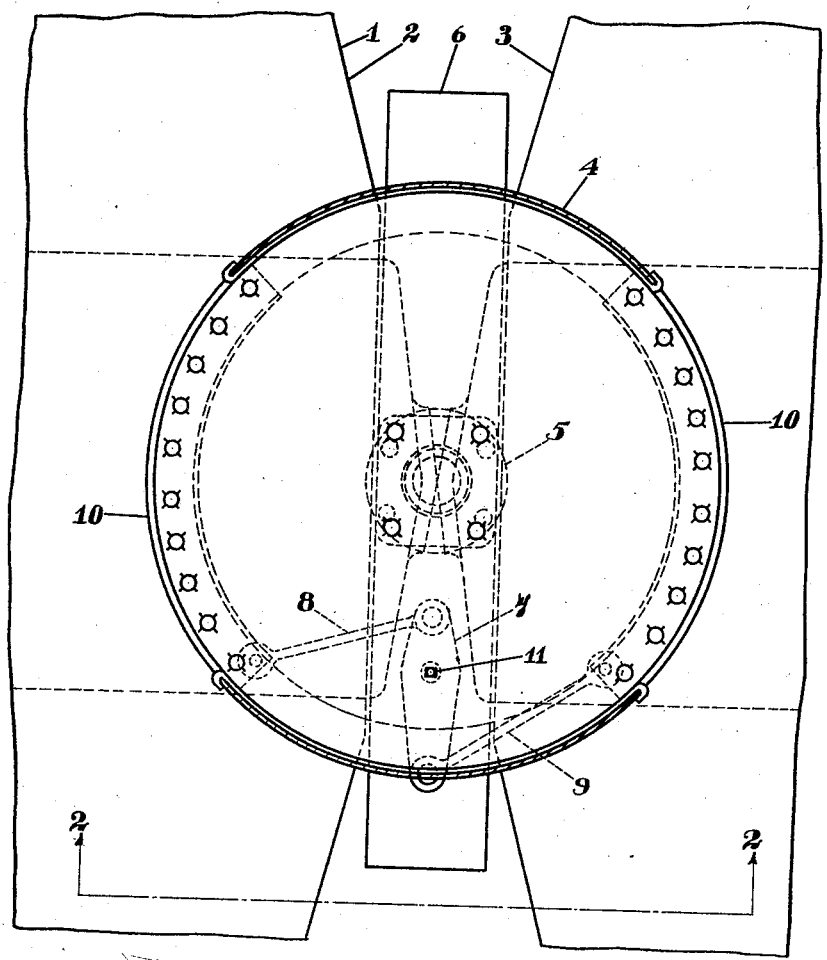
Figure 2:
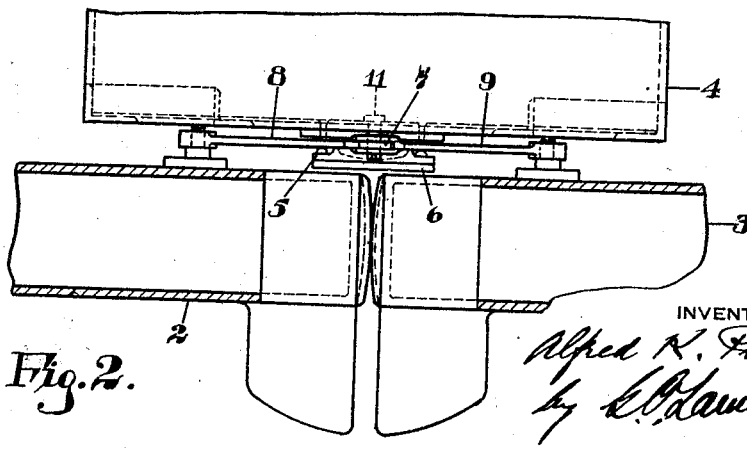
Figure 3:
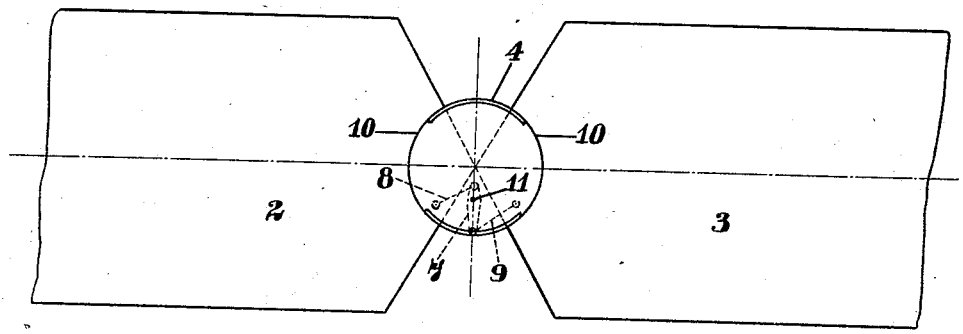
Figure 4:
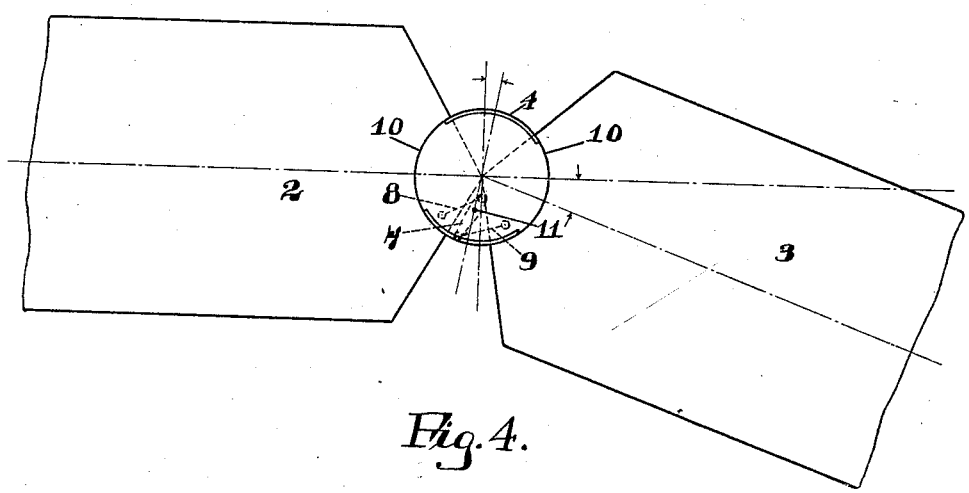
Figure 5:
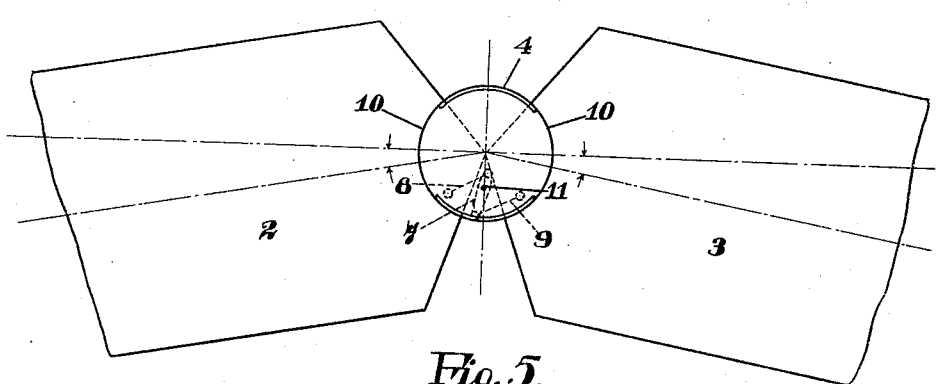

Referring now to the drawings, Fig. 1 is a partial plan view of an articulated car unit showing the relation of the passageway member to the adjacent car bodies and the passageway drive mechanism; Fig. 2 is an elevational view of the adjacent car bodies and passageway member and passageway drive mechanism; Figs. 3, 4 and 5 are diagram views showing the position of the drive mechanism and passageway member relative to the adjacent car bodies when both car bodies are in a straight line, when one of the car bodies is approaching a curve, and when both of the car bodies are rounding the curve, respectively.

Referring now in detail to the drawings where like reference characters refer to like parts, reference character 1 indicates an articulated car unit comprising bodies 2 and 3 and having a passageway member 4 contained between and extending into the bodies supported in a pivotal bearing 5, which in turn is contained on a bridge member 6 supported on a truck, not shown in the drawings, common to both bodies. At one side of the center of the passageway member and pivotally secured to the floor thereof is a lever 7, the ends of which are connected to the adjacent car bodies by means of link members 8 and 9.

When the articulated unit is traversing a straight portion of the track, the lever member 7 and link members 8 and 9 serve to maintain the openings 10 in the passageway member in communication with the openings in the ends of the adjacent car bodies. This position is best shown by means of Fig. 1 and the diagram Fig. 3.

Whenever the articulated unit is entering a curve and one body has entered the curved portion of the track while the other body is still on the straight portion, the two bodies would assume the position shown by means of the diagram in Fig. 4. Should the passageway member 4 remain in the same position relative to the car bodies as shown in Fig. 3 when one of the car bodies such as 3 is moved to the position shown in Fig. 4, the opening in the passageway member would face towards one side of the turning body, thus restricting the width of the opening and making it difficult for passengers to walk from one car body to the other. However, by the use of the drive mechanism as shown in the drawings, as soon as the body 3 begins to turn, the link member 9 connected to the body 3 changes its position with respect to the passageway member 4 and transmits motion to the lever member 7, causing this lever member to rotate about its point of attachment 11 to the floor of the passageway member. The adjacent car body 2 being on the straight portion of the track does not change its position with relation to the passageway member, and any rotation of the lever member 7 causes a corresponding movement of the passageway member 4. The link members 8 and 9 being of unequal length and the point of attachment of the lever member 7 being as shown in the drawings, the passageway member does not turn through as great an angle as the car body 3, but only a proportionate amount which is roughly one-half the angle described by the body 3. Thus the passageway member 4 turns a proportionate amount with the opening in the body 3 and moves away the same amount from the opening in the body 2, thus compensating for the difference in movement between the two bodies and maintaining a free and uninterrupted means of communication between the two car bodies.

When, as shown in Fig. 5, both car bodies have entered the curved portion of the track and each body has turned the same amount away from the position as shown in Fig. 3, the portions of the drive mechanism attached to each of the adjacent car body ends by moving the same angular amount causes the passageway member to remain in the position as shown in Fig. 1 and maintains a free and uninterrupted means of passage between the two car bodies as previously described.

Having thus described the invention what I claim as new and desire to secure by Letters Patent is:

1. In an articulated car unit, a passageway member between and extending into the adjacent ends of the two adjacent car bodies, and a passageway drive mechanism, said mechanism comprising a lever pivotally mounted on the base of the passageway member and connected near each one of its ends to one of the two adjacent car bodies.

2. The combination in an articulated car unit of a passageway member pivotally supported between the adjacent car bodies and a passageway drive mechanism, said mechanism comprising a lever pivotally mounted on the base of the passageway member, and connected near each of its ends to one of the two adjacent car bodies.

3. In an articulated car unit, a passageway member between and extending into the ends of the two adjacent car bodies, a passageway drive mechanism, said mechanism comprising members of unequal length pivoted at one end to the ends of the two adjacent car bodies and at the other end to a lever with unequal arms pivotally mounted on the passageway member.

4. The combination in an articulated car unit of adjacent ends of adjacent car bodies supported on a common truck, a passageway member pivotally supported on said truck and extending between the adjacent ends of the two adjacent car bodies, a passageway drive mechanism, said mechanism comprising members of unequal length pivoted at one end to the ends of the two adjacent car bodies and at the other ends attached to a lever of unequal arms pivotally mounted on the passageway member.

5. The combination in an articulated car unit of adjacent ends of two adjacent car bodies supported on a common truck, a hollow cylindrical passageway member between the adjacent ends of the car bodies and a passageway drive mechanism, said mechanism comprising a member pivotally mounted on the underside of the passageway member having each of its end portions connected to one of the adjacent car bodies.

6. In an articulated car unit, adjacent ends of two adjacent car bodies supported on a common truck, a passageway member pivotally supported between and extending into the adjacent ends of said car bodies and a passageway drive mechanism, said mechanism comprising a member pivotally mounted on the underside of the passageway member having each of its end portions connected to one of the adjacent car bodies.

In testimony whereof I affix my signature.

ALFRED K. PEHRSON.